Patented Dec. 15, 1936

2,063,893

UNITED STATES PATENT OFFICE 2,063,893

METHOD OF PRODUCING PAVING MATERIAL

Willie L. Holbrook and William R. Parker, Houston, Tex.

No Drawing. Application January 12, 1935, Serial No. 1,542

4 Claims. (Cl. 106—31)

This invention relates to a method of producing paving material and has particular relation to a novel method of combining shell with asphalt in the production of such material.

An object of the invention resides in a novel method of preparing shell and so combining the same with asphalt as to produce a novel type of coating about the shell which is mingled with and distributed throughout the asphalt.

With the above and other objects in view, the invention relates to a novel method for forming a paving material more accurately explained in the following specification and defined by the claims appended hereto.

In carrying out the method, shell, commonly known as mud shell, and taken from a dead shell reef, is obtained and is washed free from all mud, silt, and other foreign matter that would interfere with the coating of the shell with an asphalt or similar bituminous product. The shell that are too large for use in the desired paving material may be reduced to the desired size by crushing the same, or, they may be screened out. When the shell is washed so as to remove the mud, silt, and decayed substances from the outer surface, it is exposed to the air for a time and should be agitated to permit the free water to drain out and thereupon sufficient oxidation will take place to cause a thin coating to form thereon which will assist in forming a thin paste on the shell when the shell is subjected to the subsequent mixing process as will be hereinafter more fully explained. The shell, as above prepared, is then placed in a suitable type of mixer and while being mixed therein, is sprayed with a specially prepared asphalt or similar bituminous product which is cut back with naphtha or other suitable solvent and the desired viscosity is obtained.

As the shell is agitated in the mixer and in a cold and dry state, or, if preferred, in a cold and damp state, fine grindings or shell dust will be produced which will be ground in with the moisture in the shell, if moist, forming a paste-like substance and during this mixing process, the asphalt or bitumen, prepared as above stated, is sprayed over the shell while the latter is being mixed, and the naphtha or other solvent in the asphalt is combined with the shell paste and acts as a dispersion agent and the asphalt or bitumen emulsifies with the moisture on the shell if the shell is moist, and if the shell is dry, the dust will mix with the bitumen in the same manner, thus causing the shell to become thoroughly coated with the bitumen or asphalt. The mixing and agitating process in the mixer is continued until the desired results are obtained. The grinding of the shell against each other while the bitumen or asphalt is being sprayed thereover facilitates the emulsification. The shell grindings, whether the shell is dry or moist, mixes with the bitumen and forms a firm, tough, coating about the shell due to the calcium carbonate contents of the grindings, which makes the bitumen harder and more weather resisting.

Emulsified asphalt may be used if desired, and in such case, the paste-like substance formed on the shell and the dispersion agent used to emulsify the asphalt work in harmony with each other to cause the shell to become thoroughly coated.

The emulsification of the cut back asphalt or bitumen takes place in the mixer while the shell is being agitated, the solvent, such as naphtha, being used so that the desired viscosity of the asphalt or bitumen will be attained without the necessity of bringing the same to a high degree of temperature, and the asphalt or other bitumen will be maintained in fluid state while the same is being mixed, stored, or handled in bulk, and while the same is being laid on the prepared roadway; but when once laid and exposed to the air, a portion of the solvent will evaporate and the asphalt or other bitumen will soon harden so as to provide a durable wearing surface for streets, roads, and the like.

What we claim is:—

1. The method of producing paving material which comprises agitating a mass of shell in a mixer to produce fine grindings, or shell particles, retaining said particles in the mass, spraying the mass with a cold bituminous product during the mixing process and causing the bitumen to combine with the small particles to form a coating about the shell.

2. The method of producing paving material which comprises agitating a mass of clean, moist, shell in a mixer to cause a grinding contact of the shell thereby producing fine grindings of particles of shell and causing said fine particles to combine with the moisture and form paste-like coatings about the individual shell, meanwhile spraying the mass with asphalt in a cold state.

3. The method of producing paving material which comprises agitating a mass of clean shell in a mixer to cause a grinding contact of the shell to produce shell dust, retaining said dust in the mass, spraying cold bitumen over the mass while the same is being mixed and causing the bitumen to combine with the shell dust to form a paste-like coating about the individual shell.

4. The method of producing paving material which comprises agitating a mass of clean, moist, shell in a cold state in a mixer to cause a grinding contact of the shell thereby producing fine grindings of particles of shell and causing said fine particles to combine with the moisture and form paste-like coatings about the individual shell, meanwhile spraying the mass with cold bitumen, which has been diluted with naphtha.

WILLIE L. HOLBROOK.
WILLIAM R. PARKER.